US005202180A

United States Patent [19]

Watts

[11] Patent Number: 5,202,180

[45] Date of Patent: Apr. 13, 1993

[54] DECORATIVE WEB

[75] Inventor: Gary R. Watts, Ashtabula, Ohio

[73] Assignee: Avery Dennison Corporation, Pasadena, Calif.

[21] Appl. No.: 475,707

[22] Filed: Feb. 6, 1990

[51] Int. Cl.[5] ................................ B32B 5/16

[52] U.S. Cl. ................................ 428/324; 106/404; 106/417; 428/327; 428/328; 428/334; 428/542.6; 428/689

[58] Field of Search ................ 428/542.6, 323, 31, 428/40, 328, 334, 687, 327, 324; 106/404, 417

[56] References Cited

U.S. PATENT DOCUMENTS

| | | | |
|---|---|---|---|
| 3,988,494 | 10/1976 | McAdow | 428/407 |
| 4,267,229 | 5/1981 | Knight et al. | 428/324 |
| 4,321,087 | 3/1982 | Levine et al. | 106/404 |
| 4,598,020 | 7/1986 | Panush | 428/324 |
| 4,931,324 | 6/1990 | Ellison et al. | 428/31 |

*Primary Examiner*—Paul J. Thibodeau
*Assistant Examiner*—Hoa T. Le
*Attorney, Agent, or Firm*—Pearne, Gordon, McCoy & Granger

[57] ABSTRACT

A flexible decorative web that can be laminated to a substrate and that exhibits serial changes in its appearance with changes in viewing angle relative to incident white light. Chromatic, iridescent and metallic pigments produce three separate appearance zones where the chromatic pigment is most predominant, where the iridescent pigment is most predominant and where a transition occurs and neither the chromatic pigment nor the iridescent pigment predominates. The metallic pigment accentuates the iridescent appearance or flash by its sparkle effect produced both in the iridescent appearance areas and in the transition areas immediately surrounding and highlighting the iridescent appearance areas.

4 Claims, 2 Drawing Sheets

DECORATIVE WEB

BACKGROUND OF THE INVENTION

The invention relates to decorative coatings and, in particular, to a web capable of being laminated to a substrate that changes appearance as the angle of view changes from the angle of light reflection.

PRIOR ART

Decorative surface coatings have been developed to provide a variety of visual effects. It has long been common, for example, to incorporate aluminum particles or flakes in transparent, translucent or color pigmented coatings to give sparkle or glitter to such coatings. In more recent times, small flakes of aluminum metallized polyethylene terephthalate (Mylar) have been used as a substitute for aluminum flakes. Iridescent pigments have been used in coatings and web constructions to produce a color-change effect, sometimes called flash or down flop, in clear or color pigmented coatings.

SUMMARY OF THE INVENTION

The invention provides a decorative web, capable of being laminated to a substrate, that exhibits dramatic serial changes in its appearance when viewed or illuminated from different angles. In accordance with the invention, the web is given a base color by a chromatic pigment, a reflective flash color by an iridescent pigment and a flash color enhancement by a metallic sparkle pigment.

As disclosed, the relative proportions of the pigments are selected and balanced to ensure that the effect of each is not overpowered or masked by the presence of the others. The iridescent flash color may be complementary, contrasting, or simply of a different shade from the base chromatic pigment color. The metallic flake pigment, ideally, is in the form of relatively large flakes that are aligned with the plane of the web and are relatively sparsely distributed across the face of the web.

The relative proportions of the pigments are critically balanced in such a manner that each pigment is capable of exhibiting a strong visual effect. Depending on the angle of view, the web exhibits several distinct appearances. In one range the chromatic pigment is predominant. In another range, the appearance is that of a combination of the iridescent and sparkling metallic flake pigments. Between these two ranges there is a third transition range where all three pigments contribute in the appearance of the web.

The metallic flake pigment is preferably comprised of flakes that are relatively large in their face dimension, with reference to the preferred thickness of the web, so that they align with the plane of the web and so that they are visible as discreet elements with the unaided but focused eye at moderate distances. Preferably, the density or loading of the metallic flake pigment is relatively light so that the color effects of the chromatic and iridescent pigments are not seriously diminished by a metallic or silvery cast which condition might otherwise exist where the metallic flake content is relatively high and the flakes are present in a high density throughout the face of the web. The change in color or "flash" imparted by the iridescent pigment, in accordance with the invention, is dramatically highlighted with the sparkle contributed by the metallic flake pigment which has its greatest effect in the flash area and which additionally borders the flash area to focus an observer's attention on this area.

DESCRIPTION OF THE PREFERRED EMBODIMENTS

Figure 1:
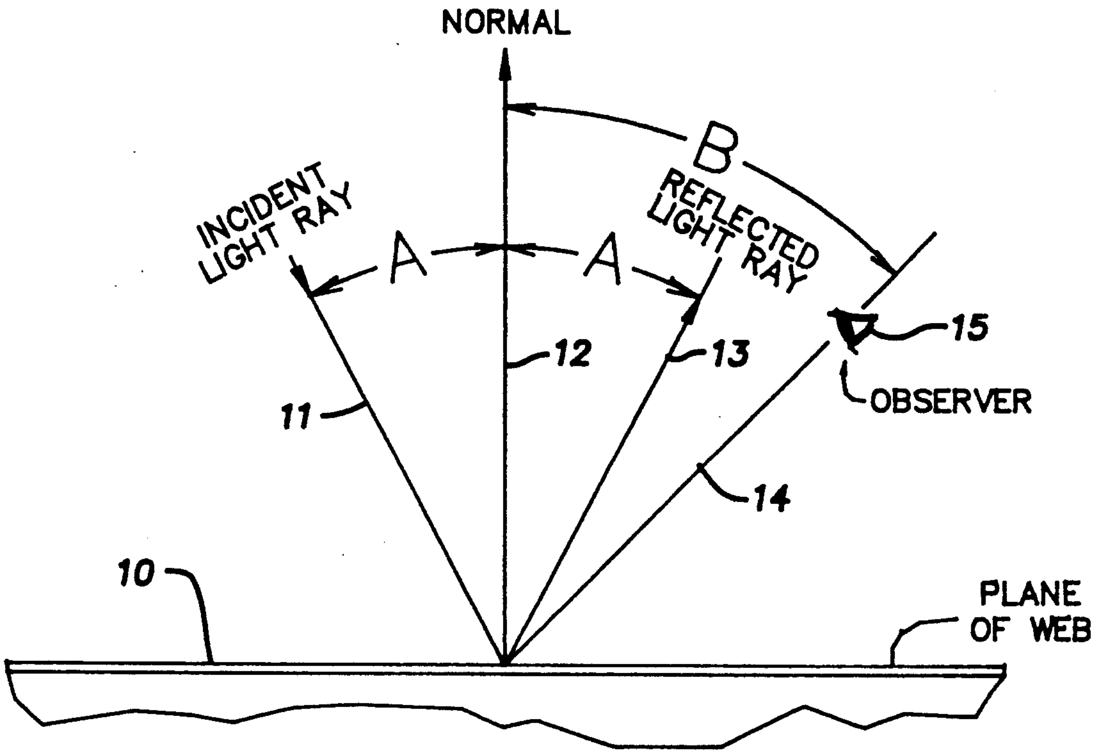
FIG. 1 is a diagrammatic view illustrating the relationships between an incident light ray, a reflected light ray, and a viewing angle.

Referring now to the drawings, there is shown a web 10 of flexible film material that can be laminated to a substrate such as a vehicle body, appliance or architectural surface. The web can be provided with a suitable pressure-sensitive adhesive or other means to adhere or otherwise laminate it to such substrate. The web 10 typically is formed of an organic plastic material such as a plasticized vinyl formed in any suitable commercially known process. One suitable known process is by coating a continuous, reusable paper web and then stripping the web coating from this reusable carrier web. The web 10 is preferably filled or loaded with appearance additives in the form of a chromatic pigment, an iridescent pigment and a metal flake pigment.

The web 10 preferably has a thickness in the range of about between 0.002 inch to 0.005 inch and preferably about 0.0035 inch. The chromatic pigment can be selected from a wide variety of known coloring agents compatible for use with the base material from which the web is cast or otherwise made. The chromatic pigment gives the web its base color. The iridescent pigment is preferably of a known type such as tin oxide mica platelets. Such platelets have face dimensions, for example, in a range of 10 to 40 microns. The respective thicknesses of the tin oxide and mica are arranged, in a known manner, when illuminated by white light to yield by reflection a preselected characteristic color. The color of the chromatic pigment and the iridescent pigment can be complementary, contrasting or of a different shade.

The metallic flake pigment, ideally, is of a commercially available type that is formed of aluminized polyethylene terephthalate (Mylar). This film is divided into regularly sized rectangular or square flakes. Typically, such flakes can range between about 0.0025 inches to 0.008 inches in face dimension, one satisfactory flake size being 0.004 inch square and 0.0005 inch in thickness.

The pigments are blended and uniformly dispersed in the bulk web material resin. As the web 10 is cast, extruded or otherwise formed into a sheet from the bulk resin and pigment compound, the plate-like elements of the iridescent pigment and metallic flake pigment are caused to align themselves with the plane of the web. Where the web is cast in a conventionally known manner and passed through a forming roll, viscous and other forces operate effectively to orient these particles with the plane of the web. As the web resin solidifies, the plate-like particles of pigment are permanently held in this preferred orientation.

By way of example of the invention, the web depicted in FIGS. 1-4 is a cast plasticized vinyl film having the following properties and proportions by volume.

Base Material—87.8% volume flexible cast vinyl (such as the vinyl sold by Fasson Division of Avery International Company under the product designation FASCAL 1900 Series).

Chromatic Pigment—0.1% volume An organic pigment in a particle size range of about 0.02 to 0.07 microns (such as the pigment sold by Harwick Chemical Corporation under the trademark STAN-TONE which includes pigment and plasticizer).

Iridescent Pigment—8.0% volume Mica (mineral) coated with titanium dioxide in a particle size range of about 10-40 microns (such as the pigment sold by E M Industries, Inc. under the trademark AFFLAIR).

Metallic Flake Pigment—4.0% volume Aluminum metallized polyethylene terephthalate in a nominal particle size of 0.004 inch square by 0.0005 inch thick (such as sold by Glitterex Corporation under the trademark POLYFLAKE).

The chromatic pigment gives the web a distinct vibrant color, e.g. gold. The iridescent pigment exhibits a reflection color of red, for example, which is different from the color of the chromatic pigment. The metallic flake pigment produces a sparkle or specular reflection from an aluminized surface that is natural, i.e. silver metallic in color.

FIG. 1 diagrammatically illustrates certain relationships which aid in a description of the way a person perceives the web 10. An incident light ray 11 making an angle A with a line 12 normal to the plane of the web 10 can become a reflected ray 13 leaving the web at an angle A on the opposite side of the normal line 12 at the same angle A. A line of view 14 from the eye 15 of a human observer makes an angle B from the normal or perpendicular reference line 12. When the angle of view B is equal or not substantially different than angle A, i.e. as within ±15° of A, the observer's eye 15 sees the iridescent flash color in its most predominant display. How close the angle B must be to angle A to view the iridescent reflected flash color depends on how well the iridescent pigment platelets are aligned with the plane of the web. In most instances, where the pigment platelets are satisfactorily aligned, the iridescent effect is not apparent when angle B differs from A by some angle, for example, ±15° or more. Where the flakes of the metallic pigment are properly aligned with the web, they are most readily seen, like the iridescent reflected color, when the angle of view B is equal to the angle of reflected light. Typically, however, since these flakes are not perfectly aligned, they will also regularly be seen at viewing angles somewhat greater and lesser than the angle A, again for example, within angles of ±15° or more.

Figure 2:
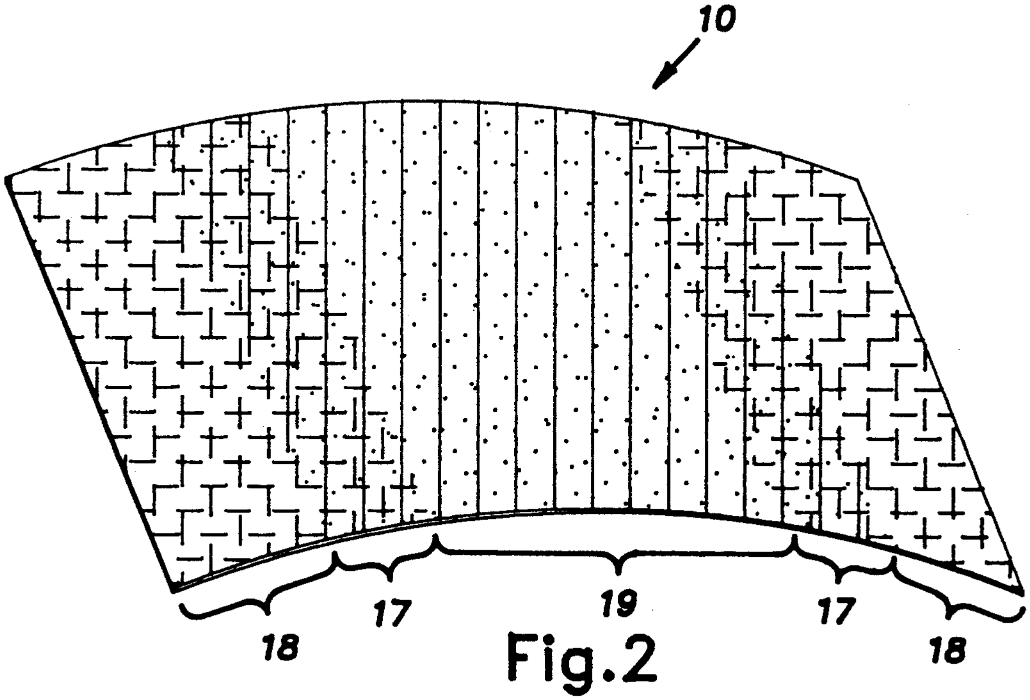
FIG. 2 is a diagrammatic representation of a web material constructed in accordance with the present invention illustrating "flash" or "down flop" effect where the color appearance of the web changes as a function of the viewing angle.

The appearance of the web article 10 is simulated diagrammatically in FIG. 2. Areas 18 of the web that are viewed from an angle substantially different than the angle of reflected light have the characteristic color of the chromatic pigment, in the illustrated case gold. Areas 19 of the web viewed from an angle generally equal to the reflected light have a characteristic color or cast of the iridescent pigment which in the illustrated case is red. While this red reflecting pigment does not completely overcome the chromatic pigment so as to appear bright red, it does contribute significant color to completely change the perceived color of the web from that which appears in other areas 18 of the web where there is essentially no color contribution from the iridescent pigment, i.e. from areas where the angle of view is greatly different than the angle of reflected light.

The change in color with viewing angle is sometimes called "flash" or "down flop".

The metallic flake pigment has the surprising effect of greatly enhancing and dramatizing the flash of the iridescent pigment. This enhancement is due in part to the glitter or sparkle that it imparts throughout any of the areas 19 that are exhibiting flash. The specular reflectivity or sparkle of the metallic pigment particles, ideally, is clearly visible even at transition areas 17 where the color appearance of the web is changing from an area primarily dominated by the chromatic pigment to an area where the iridescent pigment has its greatest visual impact in color contribution.

Figure 3:
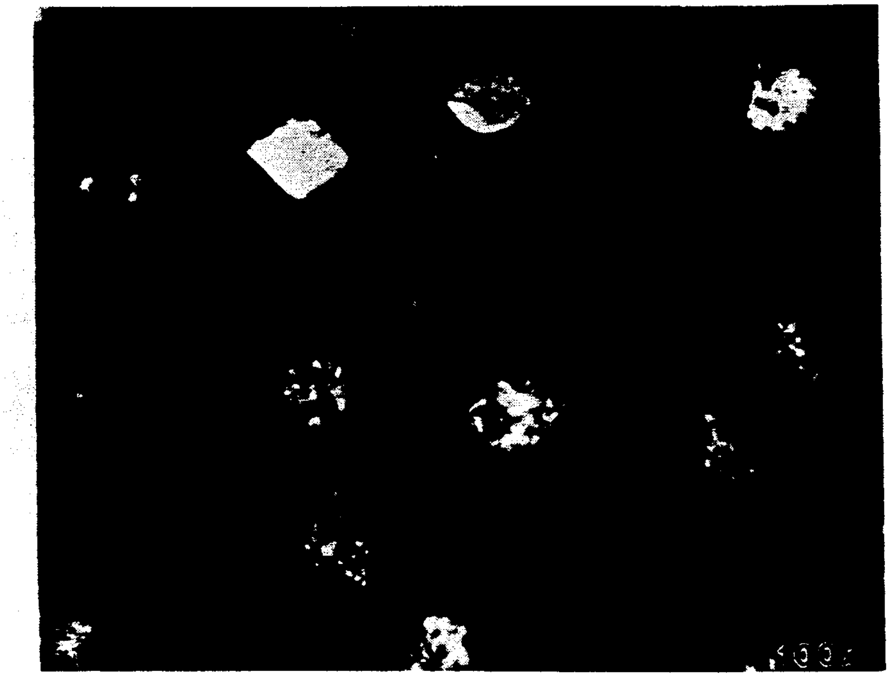
FIGS. 3 and 4 are typical photomicrographs of a web constructed in accordance with the invention illustrating its surface at a magnification of 100.
Figure 4:

Other factors, it is believed, contribute to the dramatic fiery effect of the flash. The loading of metallic flake pigment is limited so that the flakes only appear at random spaced points in the field of the flash effect. By limiting the percent volume and therefore the population density of the metallic flakes, the true flash color of the iridescent pigment is not washed out by a metallic or silvery hue running uniformly through the field of the iridescent flash color. Preferably, the loading of the metallic flake pigment resulting from the formulation given above produces a condition illustrated in FIGS. 3 and 4. FIGS. 3 and 4 show flakes either fully exposed or partially obscured by other pigment in numbers of about 12 and 15 flakes respectively for an average of about 13½. Given that the flakes are 0.004 inch×0.004 inch square and that each photo represents an area of about 0.00158 square inches, the flakes cover about 14% of the face area of the web 10. Preferably, the metallic flakes extend over less than about 28% of the face area of the web.

Experimentation shows that an increase in the relative volume of metallic flake pigment in the formula given above with a proportional decrease in the iridescent pigment is detrimental to the desired visual effect. For instance, an increase of 50% of metallic pigment and a corresponding decrease in the iridescent pigment results in a product judged to be marginal in the desired visual effect. Where the metallic pigment is increased 100% from that given in the above preferred formula, with a corresponding decrease in iridescent pigment, the resulting product is judged poor in appearance.

Experimentation also shows that a decrease in the relative volume of metallic pigment from the exemplary formula can have a detrimental effect. Where the metallic pigment concentration is reduced to one-tenth of that in the exemplary formula, with a corresponding increase in the iridescent pigment, the resulting product has been judged to be so lacking in sparkle as to be unacceptable.

The flakes of the metallic pigment ideally are sufficiently large to be seen individually when reflecting bright light by the unaided eye at a moderate distance of an arm's length, i.e. a distance of, for example, 2 feet. Metallic flakes having this general particle size are highly visible with their characteristically specular reflection or sparkle especially in the transition areas 17 in FIG. 2. This characteristic of the metal flake pigment marks or highlights the borders of these transition zones and gives the adjacent flash areas added visual impact.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A decorative web for application to a support surface, comprising a flexible film material having a thickness of about between 0.002 inch to 0.005 inch, the film including a chromatic pigment, an iridescent pigment and metallic flake pigment, the iridescent pigment being in the form of platelets that reflect light of a characteristic color that is distinctive from the color of the chromatic pigment, the volume proportions of the chromatic pigment, iridescent pigment and metallic flake pigment relative to each other being selected to produce an appearance that varies depending on the angle of view of an observer and the angle of incident white light, the web exhibiting three separate and readily perceptible appearances including an appearance where the chromatic pigment has its most prominent effect, an appearance where the iridescent pigment has its most prominent effect and an intermediate appearance being the result of a combination of the chromatic pigment and iridescent pigment, the metallic flake pigment visually heightening the effect of the iridescent pigment by a visually evident sparkle in the zone in which the iridescent pigment is most visually predominant and in a highlighting zone in which the intermediate appearance occurs, the metallic flakes forming the metallic flake pigment having face area dimensions and a thickness that is small in comparison to their face area dimensions, the metallic flake face area dimensions being of the same order of magnitude as the thickness of the web, the metallic flakes being aligned with the web so that they are visible as discreet elements with the unaided eye, the volume proportion of the metallic flake pigment being limited so that the metallic flakes extend over less than about 28% of the total surface area of the web.

2. A web as set forth in claim 1, wherein metallic flake pigment comprises flakes of metallized polyethylene terephthalate.

3. A web as set forth in claim 2, wherein the web has a thickness of approximately 0.0035 inch and the metallized particles have a face size corresponding to a 0.004 inch square.

4. A decorative web for application to a rigid substrate comprising a flexible film of between about 0.0025 inch and 0.0055 inch thickness in which is uniformly dispersed appearance additives in the form of a chromatic pigment, an iridescent pigment having a characteristic reflection color, and metallic flake pigment, the volume proportions of the appearance additives being selected to ensure that each additive makes a substantial visual contribution to the appearance of the web, the flakes of the metallic pigment having face dimensions of about between 0.0025 inches and 0.008 inches, the iridescent pigment being formed of platelets substantially smaller than the metallic flakes and reflecting a characteristic color different than that of the chromatic pigment, the metallic flakes and iridescent pigment platelets being predominantly aligned with the plane of the web, the web exhibiting a flash of color reflected by the iridescent pigment when viewed at an angle substantially the same as the angle of reflection, the color flash being highlighted by the sparkle of specular reflection from the metallic flakes throughout the area of iridescent flash and in areas immediately adjacent such iridescent flash areas where the angle of view is near the angle of reflected light, the predominant color of the web viewed at angles largely displaced from the angle of reflected light being that of the chromatic pigment whereby the web exhibits three distinct visual appearances including a) the combined iridescent pigment color with sparkle, b) combined iridescent pigment color and chromatic pigment color with sparkle, and c) chromatic pigment color, the volume proportion of the metallic flake pigment being limited so that the metallic flakes extend over less than about 28% of the total surface area of the web so that the metallic flakes when reflecting light, are seen by the unaided eye as distinct sparkling elements.

* * * * *